United States Patent [19]

Ishihara

[11] 4,419,306

[45] Dec. 6, 1983

[54] AUTOMATIC CONTROL OF THE LENGTH OF ARTICLE ROW TO BE INJECTION-MOLDED

[75] Inventor: Kiyomitsu Ishihara, Uozu, Japan

[73] Assignee: Yoshida Kogyo K. K., Tokyo, Japan

[21] Appl. No.: 372,281

[22] Filed: Apr. 27, 1982

[30] Foreign Application Priority Data

Apr. 27, 1981 [JP] Japan ................... 56-62532

[51] Int. Cl.³ .............................................. B29F 1/05
[52] U.S. Cl. ............................... 264/40.5; 264/297.2; 264/328.8; 425/150; 425/588
[58] Field of Search ................. 264/40.5, 297.2, 328.8; 425/150, 588

[56] References Cited

U.S. PATENT DOCUMENTS 3,270,377  9/1966  Parker ........................... 425/588 X

*Primary Examiner*—Thomas P. Pavelko
*Attorney, Agent, or Firm*—Hill, Van Santen, Steadman & Simpson

[57] ABSTRACT

A method of automatically controlling the length of a row of articles to be injection-molded on a multi-cavity mold having an elongate runner and a plurality of successive cavities spaced equidistantly along the runner, comprising the steps of: detecting an initial position of a control rod inserted in the runner; registering both the direction and the extent to which the control rod is to be moved for longitudinal adjustment with respect to the runner, depending on the initial position of the control rod and a preselected length of the article row to be molded; moving the control rod longitudinally of the runner in the registered direction; detecting the movement of the control rod to the registered extent; and in response to the last-named detecting, terminating the movement of the control rod. An apparatus for carrying out this method is also disclosed.

4 Claims, 2 Drawing Figures

AUTOMATIC CONTROL OF THE LENGTH OF ARTICLE ROW TO BE INJECTION-MOLDED

BACKGROUND OF THE INVENTION

1. Field of the Invention

The present invention relates to injection molding, and more particularly to a method of and apparatus for automatically controlling the length of a row of articles, such as slide fastener coupling elements, to be injection-molded on a multi-cavity mold.

2. Prior Art

In the manufacture of slide fasteners, it is known that a row of coupling elements is injection-molded on one longitudinal edge of a fastener stringer tape placed between a pair of mold halves jointly defining an elongate runner and a plurality of successive cavities spaced at equal intervals along the runner. To this end, various slide fasteners of different lengths require a plurality of multi-cavity molds each having a succession of cavities of a different row length. A suitable one of the molds must be chosen, depending on the length of a row of coupling elements to be molded, which is laborious and time-consuming. The same problem has been experienced in the production of a series of other thermoplastic articles.

SUMMARY OF THE INVENTION

According to the present invention, a method of automatically controlling the length of a row of articles to be injection-molded on a multi-cavity mold having an elongate runner and a plurality of successive cavities spaced equidistantly along the runner, comprises the steps of: detecting an initial position of a control rod inserted in the runner; registering both the direction and the extent to which the control rod is to be moved for longitudinal adjustment with respect to the runner, depending on the initial position of the control rod and a preselected length of the article row to be molded; moving the control rod longitudinally of the runner in the registered direction; detecting the movement of the control rod to the registered extent; and in response to the last-mentioned detecting, terminating the movement of the control rod. An apparatus for carrying out the method is also claimed.

It is therefore a primary object of the invention to provide a method of automatically controlling the length of a row of articles to be injection-molded on a multi-cavity mold, which can be used for the molding of articles of a different series length, thus requiring no separate molds having cavities of a different series length.

Another object of the invention is to provide an apparatus for carrying out the above-mentioned method.

Many other advantages, features and additional objects of the present invention will become manifest to those versed in the art upon making reference to the detailed description and the accompanying drawings in which a preferred embodiment incorporating the principles of the present invention is shown by way of illustrative example.

DETAILED DESCRIPTION

Figure 1:
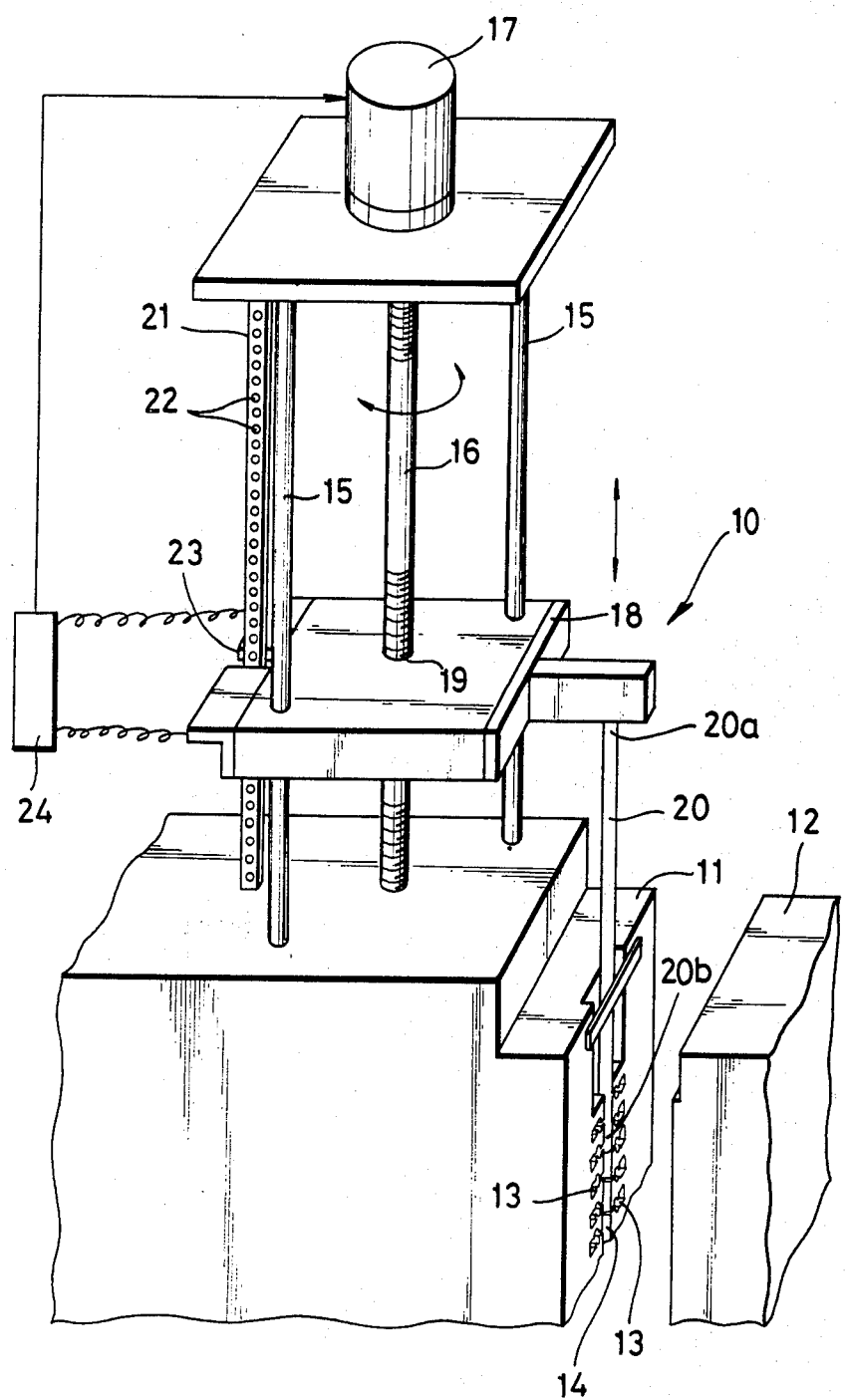
FIG. 1 is a perspective view of an apparatus embodying the present invention, with a pair of mold halves fragmentarily shown.
Figure 2:
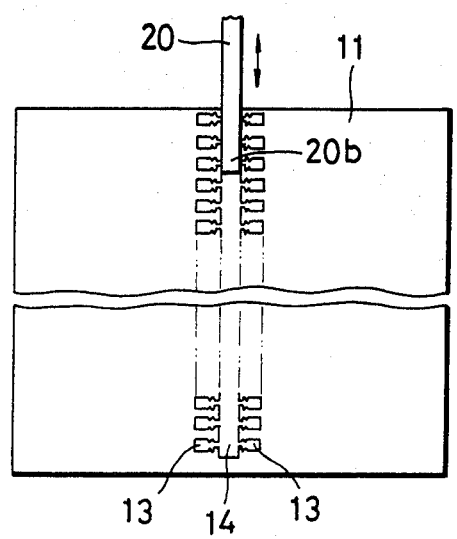
FIG. 2 is a plan view of a surface of one mold half, showing a control rod inserted is a runner of the mold.

FIG. 1 shows an apparatus 10 for automatically controlling the length of a pair of rows of thermoplastic articles (not shown) to be injection-molded on a multi-cavity mold including a pair of first and second mold halves 11,12. The first mold half 11 is stationary, and the second mold half 11 is movable toward and away from the first mold half 12 to close and open the mold. As better shown in FIG. 2, the illustrated mold 11,12 is for use in the manufacture of slide fastener coupling elements and hence has a pair of rows of equidistantly spaced cavities 13,13 disposed one row on each side of an elongate straight runner 14, each cavity 13 having a contour corresponding to the shape of a single coupling element. The cavities 13 may have any other shape. When heated thermoplastic molding material is injected into the closed mold with a pair of fastener stringer tapes (not shown) placed between the first and second mold halves 11,12, a pair of rows of thermoplastic coupling elements is formed on the stringer tapes along their respective inner longitudinal edges, as is well known in the art.

The apparatus 10 comprises a pair of vertical posts 15,15 supported on the first mold half 11, a threaded spindle or shaft 16 rotatably supported on the first mold half 11 and extending parallel to the posts 15,15, a suitable drive means 17 for rotating the threaded shaft 16 in either direction, and a slide 18 slidably mounted on the posts 15,15 and having a threaded hole 19 through which the threaded shaft 16 threadedly extends. The slide 18 is vertically movable, in response to rotation of the threaded shaft 16, toward and away from the first mold half 11, depending on the direction of rotation of the threaded shaft 16.

A control rod 20 is supported at its upper end 20a by the slide 18 and projects into the runner 14. The control rod 20, in response to the vertical movement of the slide 18, is movable longitudinally of the runner 14 for allowing heated thermoplastic molding material to be filled in only a selected number of the successive cavities 13 that are disposed below the lower or free end 20b of the control rod 20, the selected number corresponding to the length of a row of articles to be molded. Under such a condition, the remaining cavities 13 that are disposed above the free end 20b of the control rod 20 are prevented from being filled with heated molding material.

A fixed scale 21 extends parallel to the threaded shaft 16 and has a plurality of equidistantly spaced marks 22, e.g. in the form of openings, indicative of the corresponding positions of the free end 20b of the control rod 20 in the runner 14. A detector 23 is mounted on the slide 18 at such a position that the detector 23 is moved past the marks 22 successively as the slide 18 is moved vertically, for producing a signal pulse every time each mark 22 is passed by the detector 23. Preferably, the detector 23 comprises a light source and a photoelectric transducer element disposed one on each side of the scale 21. Alternatively, the detector 23 may be a proximity switch or a limit switch.

The apparatus 10 also comprises a control unit 24, of a servo system type for sensing and correcting errors in position. To that end, the unit 24 is operatively connected to both the detector 23 and the drive means 17, for producing a start signal for energizing the drive means 17 to rotate the threaded shaft 16 in a selected direction, depending on both a preselected length of the article row to be molded and an initial position of the free end 20b of the control rod 20 in the runner 14, and a termination signal, when the number of successive signal pulses produced by the detector 23 is equal to a preselected number that corresponds to the preselected length of the article row, for de-energizing the drive means 17 to terminate the rotation of thethreaded shaft 16. Other circuitry in, the control unit 24 controls injection starting time, quantity of articles to be manufactured, and feed speed of the fastener stringer tapes or fastener chain.

When a preselected number corresponding to the length of the article row to be molded is set in the control unit 24, the control unit 24 compares the preselected number with a signal from the detector 23 and then produces a start signal for energizing the drive means 17 to rotate the threaded shaft 16 in a selected direction, depending on the result of that comparison. This rotation of the threaded shaft 16 causes the slide 18 together with the control rod 20 to be moved upwardly or downwardly, depending on the direction of rotation of the threaded shaft 16. During that time the marks 22 are sensed by the detector 23 successively, which produces a signal pulse every time each mark 22 is sensed by the moving detector 23.

When the number of the successive signal pulses produced by the detector 23 is equal to the preselected number that corresponds to the length of the article row to be obtained, the control unit 24 produces a termination signal for de-energizing the drive means 17 to terminate the rotation of the threaded shaft 16. At the same time the vertical movement of the slide 18 is terminated. As a result, the control rod 20 is placed in a selected position that corresponds to the preselected length of the article row. Finally, heated thermoplastic molding material is injected into the closed mold 11,12; the molding material having been injected flows into only the selected number of the successive cavities 13 disposed below the free end 22b of the control rod 22 and does not flow into the remaining cavities 13 disposed above the free end 22b of the control rod 22. Thus the preselected length of the article row has been obtained under automatic control.

According to the present invention, it is possible to use a single multi-cavity mold for the molding of articles of a different series length, thus requiring no separate molds having cavities of a different series length that corresponds to that different length of articles.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method of automatically controlling the length of a row of articles to be injection-molded on a multi-cavity mold having an elongate runner and a plurality of successive cavities spaced equidistantly along the runner, comprising the steps of:
   (a) electrically detecting an initial position of a control rod inserted in the runner;
   (b) registering both the direction and the extent to which the control rod is to be moved for longitudinal adjustment with respect to the runner, depending on said initial position of the control rod and a preselected length of the article row to be molded;
   (c) using a motor moving the control rod longitudinally of the runner in said registered direction;
   (d) electrically detecting the movement of the control rod to said registered extent; and
   (e) in response to the last-mentioned detecting, terminating the movement of the control rod.

2. An apparatus for automatically controlling the length of a row of articles to be injection-molded on a multi-cavity mold having an elongate runner and a plurality of successive cavities spaced equidistantly along the runner, comprising:
   (a) a slide;
   (b) means for moving said slide toward and away from the mold;
   (c) a control rod projecting from said slide for extending into the runner and, in response to the movement of said slide, movable longitudinally of the runner for allowing heated molding material to be filled in only a selected number of the successive cavities that corresponds to a preselected length of a row of articles to be molded;
   (d) means for detecting an initial position of said slide and thus said control rod in the runner and also for detecting the extent to which said slide and thus said control rod is moved; and
   (e) a control unit, connected to both said moving means and said detecting means, for registering both the direction and the extent to which said control rod is to be moved for longitudinal adjustment with respect to the runner, depending on both said detected initial position of said control rod and said preselected length of the article row to molded, said control unit being adapted to produce a start signal for energizing said moving means to move said slide and thus said control rod in said registered direction, and a termination signal, when said slide and thus said control rod has been moved to said registered extent, for de-energizing said moving means to terminate the movement of said slide and thus said control rod.

3. An apparatus according to claim 2, said moving means including at least one post for being supported on the mold, a threaded shaft for being rotatably supported on the mold and extending parallel to said post, and drive means for rotating said threaded shaft in either direction, said slide being slidably mounted on said post and having a threaded hole through which said threaded shaft threadedly extends, said slide being movable, in response to rotation of said threaded shaft, toward and away from the mold, depending on the direction of rotation of said threaded shaft.

4. An apparatus according to claim 3, said detecting means including: a scale extending parallel to said threaded shaft and having a plurality of equidistantly spaced marks indicative of the corresponding positions of a free end of said control rod in the runner; and a detector, mounted on said slide at such a position that said marks are sensed by said detector successively as said slide is moved, for producing a signal pulse every time each said mark is sensed by said detector, said termination signal being produced from said control unit when the number of the successive signal pulses produced by said detector is equal to a preselected number that corresponds to said preselected length of the article row.

* * * * *